UNITED STATES PATENT OFFICE.

ANNA M. VAN DERWORP, OF DETROIT, MICHIGAN.

DRESSMAKER'S MEASURE.

SPECIFICATION forming part of Letters Patent No. 593,555, dated November 9, 1897.

Application filed February 17, 1896. Serial No. 579,662. (No model.)

*To all whom it may concern:*

Be it known that I, ANNA M. VAN DERWORP, a citizen of the United States, residing at Detroit, in the county of Wayne and State of Michigan, have invented a new and useful Improvement in Measures or Squares for Dressmakers' and Tailors' Use, of which the following is a specification.

My invention relates to improvements in a square or measure designed to draft dresses or garments the bodies of which are close-fitting and according to what is called the "tailors' system." I am aware that numerous devices have been designed for this purpose, most of them composed of two or more pieces, some elaborate, costly, and difficult to understand, and yet none so satisfactory or simple that the users are not desiring something more perfect.

My device is simple, composed of but one piece, yet ranging in capacity from an infant's garment to one for the largest size person, easy to understand, and as accurate in the lines it projects to fit the human form as it is possible under usual circumstances to make.

I attain the ends sought by the mechanism illustrated in the accompanying drawings, in which—

Figure 1 presents the side of device which gives front measures; Fig. 2, the side which gives back measures; Fig. 3, the front of a tight-fitting basque drafted by the measure.

Similar letters refer to similar parts in all the views.

I construct my square or measure as follows, and by preference as near the following dimensions as may be, having found by experience that they fully meet every want and yet leave the measure both shapely and compact.

The sides A B of the measure make an ordinary square, A being five inches and B nineteen and one-half inches long and marked for inches, quarter-inches, and eighths when needed for scales. (See Figs. 1 and 2.) The opposite edges of the measure are composed of the line $a\ b$, one inch at right angles to A, of the circular curve $b\ c$, which is described from a center $e$, four and seven-eighths inches from the line B on the four-inch line, with a radius of three inches, terminating at $c$ on the four-inch line. From the point $c$ is projected a kind of parabolic curve $c\ d$ through the following points above the line B: At the five-inch line, two inches; at the six-inch line, two and one-quarter inches; at the seven-inch line, two and one-half inches; at the eight-inch line, two and three-quarters inches; at the nine-inch line, two and fifteen-sixteenth inches; at the ten-inch line, three and one-eighth inches; at the eleven-inch line, three and one-quarter inches; at the twelve-inch line, three and three-eighths inches; at the thirteen-inch line, three and one-half inches; at the fourteen-inch line, three and nine-sixteenths inches; at the fifteen-inch line, three and one-half inches; at the sixteen-inch line, three and seven-sixteenths inches; at the seventeen-inch line, three and one-quarter inches; at the eighteen-inch line, three inches; at the nineteen-inch line, two and five-eighths inches; at the twenty-inch line, two and one-eighth inches, terminating at $d$. The oblique edge B $d$ which forms the end of the measure is consequently one-half inch out of perpendicular from line B, giving a proper slope for the back-neck measures.

The combined curved line from $b$ to $d$ as above constructed gives all the required curves necessary to draft a dress or garment, so that with the square part every line from straight to circular is obtainable.

One side of the measure contains all the scales for the front of a garment, running from twenty to fifty inches bust-measure, and this may be extended in either direction. These scales include measures for the waist, front-neck, neck and armhole curves, side-form curves, shoulder and dart curves, and bust-line curve, all scaled accurately in relation to each other and arranged in positions on the measure best adapted for their use. The reverse side of the measure contains all the scales for back-measurements placed on the same in proper relation with those on the opposite side, including bust, waist, back-neck, curve from neck to bust-line, under-arm, and child's neck measures, all as shown in the drawings, Figs. 1 and 2, which are scaled one-half size.

The application of the measure is as follows: Fig. 3 represents the front of a tight-fitting basque (scaled one-quarter size) the measurements of which are neck, twelve inches; neck to arm-scye, five inches; neck to waist, fourteen inches; under-arm, eight inches; waist, twenty-four inches; bust, thirty-four inches; chest width, thirteen inches; shoulder, four and one-half inches. Take corner of square in left-hand, "front measures" up, place square at about one inch from edges of material to be cut and draw lines A and B length of short and long sides of square, respectively, mark points on both lines at 12, scale of "front-neck." Bring corner of square down to 12, line B, and mark point for arm-scye or bust-line five inches, and length of front fourteen inches on line B. Bring corner of square down to bust-line and mark point of under-arm measure eight inches down on line B. Place corner of square on line A at 12 (neck) and bring the long arm to point for under-arm measure on line B and draw shoulder slope four and one-half inches, (12 to $h$.) Now place point of measure where the line C meets the curve edge over 12, line A, bringing the line of curve to $h$, and draw curve-line. Then dot $f$, one-quarter of inch below $h$, turn the square over, so that the curve swells upward, and, bringing it to $f$, draw curve-line from $f$ to meet the last curve near center. This gives the whole line (12 to $f$) the proper undulating slope from neck to shoulder. Place short arm of square on line B at bust-line five inches and draw line to 34, "bust-measure" scale on long arm; dot at six and one-half inches, which is half of front-chest measure. Place the corner of the square at six and one-half inches, with long arm on bust-line, and dot two inches up on short arm for arm-scye. Then place short arm of square on line B at under-arm line (eight inches) and draw line of long arm, dotting at 24 waist-scale and 34 bust-scale, the difference between the two points (three inches) being allowed for darts. Now place corner of square at fourteen-inch line B and draw waist-line to 34 on under-arm line, dotting two inches from line B for first dart-line, allowing one and one-half inches for each dart with one inch between. Turn the square over and place point where line G meets curve edge over end of waist-line, (34,) and draw curve-line up to 34, bust-line, dotting two inches below bust-line or arm-scye and three and one-half inches below the same line on line B front. Then place corner of square on three-and-one-half-inch dot and draw a line to the other, which gives the top of the darts, dotting three inches from line B for point of first dart and five and one-half inches for point of second dart. Place curve end of line C, front side, at the point of first dart—short arm of square down—and bring curve edge to dot two inches on waist-line and draw curve from point of dart down to black dot on measure. Turn the square over and place curve edge end of line G on point of same dart and bring curve edge to dot one and one-half inches from last line and draw curve down to black dot on measure. This gives the first dart. Repeat this operation from point of second dart. Then place neck-curve from point marked by a dagger near end of short arm over 12 on line B and draw curve to neck and shoulder point 12, line A, dot one-half inch off from line B. Then place the point D, end of long curve, over shoulder and arm-scye point $f$ and draw curve from that point to dot two inches above the bust-line six and one-half inches from B. Turn square over and draw arm-scye curve by placing point marked with dagger, middle of circular curve, over end of bust-line (34) and bring the curve edge to meet the last drawn curve at dot two inches. Place point of dagger at E, "curve from neck to bust," over dot half-inch in on neck-curve, bringing the curve edge to a point $g$ half-way between bust-line and top of dart-line and one-fourth inch out from line B and draw curve. Turn the square over and place the curve-edge point F over point eight inches where the under-arm line meets the line B and draw curve to meet curve $g$. Below the waist-line 14 extend the front line six inches, flaring outward one-quarter of an inch. Place line $g$ over under-arm line, which may be done by bringing the hole $o$ over the line and the point where it meets the curve edge over end of waist-line 34, and draw curve down six inches, which completes the operation.

What I claim, and desire to secure by Letters Patent, is—

A tailor's measure, having square sides A and B, a curve side composed of a quarter-circle projected into a parabolic curve with an elevation of about one-tenth its length, an oblique side, running from B, to $d$, at an angle of about one hundred and two degrees, the opening $o$, placed between the first-mentioned sides, so as to enable the operator to place the line G, on the measure, over and coincident with a line on the pattern, so as to be able to project a desired form-line, all substantially as described and shown.

ANNA M. VAN DERWORP.

Witnesses:
MARY L. BAKEMAN,
TILLIE VAN DERWORP.